E. P. SPENCER.
MILK COOLER.
No. 87,521.          Patented Mar. 2, 1869.
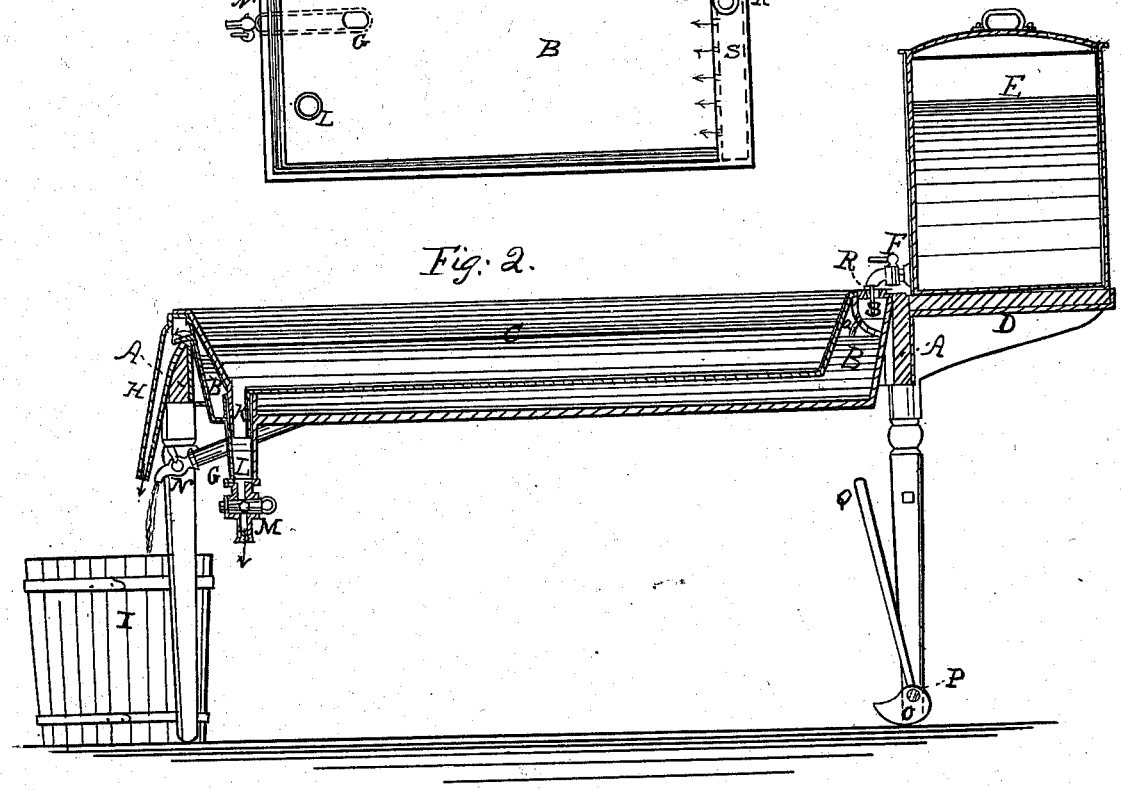
Witnesses
L. Hailer.
Jno. Johnston.
Inventor
E. P. Spencer
by Dodge & Munn
his Attys

EDWIN P. SPENCER, OF SCOTT, NEW YORK.

Letters Patent No. 87,521, dated March 2, 1869.

IMPROVEMENT IN MILK-COOLER.

The Schedule referred to in these Letters Patent and making part of the same.

*To all whom it may concern:*

Be it known that I, EDWIN P. SPENCER, of Scott, in the county of Cortland, in the State of New York, have invented an Improved Milk-Refrigerator; and I do hereby declare that the following is a full and exact description thereof, reference being had to the accompanying drawings, and to the letters of reference marked thereon.

My invention consists of an improved apparatus to be used in dairies for regulating the temperature of milk, the special features of which are hereinafter described.

Figure 1 is a top plan view of the device with the upper pan removed.

Figure 2 is a longitudinal vertical section of the apparatus complete.

In the large dairies, as now conducted in various parts of the country, the milk of a large number of cows is brought in at one time, and it is desirable to have some means of cooling the same, especially in hot weather, and also of raising it to the proper temperature in cold weather; and it is to accomplish these purposes that my invention is designed.

In constructing my apparatus, I provide a frame, A, of any suitable size, mounted on legs, as shown in fig. 2.

In this frame, I place a large oblong pan or vat, B, made preferably of sheet metal, and suspend it by a projecting rim around the edge, and, if necessary, supporting it by bars or bands underneath.

This pan B has secured across one end, near the top, a trough or pipe, S, which has a series of perforations along its entire length, for the escape of water into the pan B, there being an opening, R, at the top, through which the water enters from a reservoir, E, as represented in fig. 2. or from any other source.

This distributing-pipe S, instead of being made in the form of a pipe, may be simply a trough, open on its upper side, and have a series of perforations or notches along its front side or edge, for the escape of water into the pan B, the object being to deliver the water at points across the entire end of the pan, so as to cause a current of fresh, warm, or cool water, as the case may be, to flow evenly along the entire width of the pan, instead of a narrow current along the centre or one side only, as would be the case if the supply was delivered at a single point only.

By this means, I secure an even temperature throughout all parts of the pan, which is a very desirable object.

This pan B is provided, at its opposite end, with an escape-pipe, H, as shown in fig. 2, for the water to flow out at, and it has also in the bottom, near the same end, a pipe, G, with a cock, N, for drawing off the contents of the pan when desired.

I also provide another pan, C, of a form corresponding to that of B, except that its sides are more inclined, so as to leave a space or water-chamber around the sides, and under its bottom, as shown clearly in fig. 2. There is also a water-space between the two pans B and C.

This pan C has also a pipe or tube, K, extending from its bottom downward, and fitting snugly into the open mouth of a corresponding tube, L, in the lower pan, as shown in fig. 2, the joint of these two pipes being made water-tight, either by having what is known as a ground-joint, or by packing it with rubber, or any suitable material.

In the lower pipe L there is a cock, M, by which the contents of the upper pan C can be drawn off whenever desired without at all interfering with the contents of the lower pan B.

The upper pan C is set loosely into the lower one, and is supported by a flange around its edge, which rests upon the flange of the pan B, where the latter bears upon the frame A.

If the upper pan be made very large, so that there is a liability of its bottom sagging, it may be supported by wooden strips, placed lengthwise under it and resting on the other pan B, which will also serve to create a series of separate currents in the water between the two, from end to end; or it may be supported by metal straps passing crosswise under the bottom.

To the legs, at the upper or supply-end of the frame, I attach a shaft, P, or which I secure a pair of eccentrics, O, as shown in fig. 2, there being a lever, Q, attached to the shaft.

By this means, the shaft may be turned so that the eccentrics shall elevate that end of the pans, and thus cause the contents of the pans to flow to the opposite end, when it is desired to empty them.

In ordinary use, the milk is put into the pan C, and water allowed to flow into pan B and fill the space between them.

At certain seasons, when it is not necessary to alter the temperature, both pans may be used for holding the milk, the pan C being removed and used separately.

A table, D, may be attached, for supporting the water-reservoir E, when it is necessary to use the latter, but where a running stream or supply of water exists, these may be dispensed with and the water conducted at once into the trough S.

Having thus described my invention,
What I claim, is—

1. The combination of the pan B, provided with the distributing-trough S and the pan C, arranged to operate substantially as described.

2. The pan B, provided with the escape-pipe H, emptying-pipe G, and pipe L, the two latter being provided with cocks, substantially as and for the purpose set forth.

3. In combination with the pans B and C, constructed as set forth, the frame A, provided with shelf D and the eccentrics O, arranged to operate as herein described.

4. In a milk-tempering apparatus, the distributing-pipe or trough S, so arranged as to deliver the inflowing water at points across the entire end, or nearly so, of the water-pan, substantially as herein described.

EDWIN P. SPENCER.

Witnesses:
ARTHUR HOLMES,
JOHN W. STROWBRIDGE.